United States Patent [19]
Georgoudis

[11] 3,985,705
[45] Oct. 12, 1976

[54] STABILIZED POLYESTER COMPOSITIONS

[75] Inventor: Paul C. Georgoudis, Dunellen, N.J.

[73] Assignee: National Starch and Chemical Corporation, Bridgewater, N.J.

[22] Filed: Feb. 5, 1975

[21] Appl. No.: 547,172

Related U.S. Application Data

[62] Division of Ser. No. 348,217, April 5, 1973, Pat. No. 3,888,817.

[52] U.S. Cl. .................. 260/45.8 A; 260/45.7 PH; 260/45.95 R; 260/45.95 C
[51] Int. Cl.² ......................................... C08K 5/00
[58] Field of Search ................ 260/45.8 A, 45.95 R, 260/45.95 C

[56] References Cited
UNITED STATES PATENTS

| | | |
|---|---|---|
| 3,620,824 | 11/1971 | Slade et al.................. 260/45.8 NW |
| 3,657,191 | 4/1972 | Titzmann et al. ................. 260/75 T |
| 3,775,374 | 11/1973 | Wolfe, Jr..................... 260/45.9 QB |
| 3,880,803 | 4/1975 | Keizer .......................... 260/45.9 QB |

*Primary Examiner*—Melvyn I. Marquis
*Attorney, Agent, or Firm*—Thomas B. Graham

[57] ABSTRACT

Saturated polyester compositions stabilized against thermal degradation by the addition of small amount of a synergistic stabilizing combination of a 5 or 6 membered, cyclic organic carbonate and an antioxidant selected from the group consisting of certain alkylated phenols, polyphenols, alkylphosphites, arylphosphites, aromatic amines and aromatic diamines.

4 Claims, No Drawings

STABILIZED POLYESTER COMPOSITIONS

CROSS-REFERENCE TO RELATED APPLICATIONS

This application is a division of copending application Ser. No. 348,217, filed Apr. 5, 1973, now U.S. Pat. No. 3,888,817, and assigned to the assignee of the instant invention.

BACKGROUND OF THE INVENTION

This invention relates to novel, heat-stable polyester compositions. More particularly, this invention relates to saturated polyesters stabilized against thermal and oxidative and hydrolytic degradation by use of a synergistic combination comprising a cyclic, organic carbonate and an antioxidant.

The term "saturated polyester" encompasses a wide variety of materials which are of significant industrial and economic importance. Well-known polyester materials include polyester fibers, polyester tire cord, plasticizers, alkyds and polyester adhesives. For the purpose of this invention it is intended to include those polyesters having linear chain-like structures derived by reacting compounds such as dicarboxylic acids or their acid functioning derivatives with dihydric alcohols or by heating omega-hydroxycarboxylic acids; and those polyesters having cross-linked, three dimensional structures derived by reacting di- or polycarboxylic acids with diols or polyols; said polyesters or copolyesters may contain alkyl or aryl or cycloalkyl or other groups which are not ethylenically unsaturated.

It is well-known to those skilled in the art that most polyesters are relatively stable materials as compared with other types of polymers, e.g., polyvinyl acetate, polystyrene, polyurethanes, etc. It is also well known, however, that when polyesters are exposed to high temperatures, high humidity and air, as they often must during processing and application from the molten state, they tend to degrade badly with detrimental loss of physical and chemical properties. This condition often results in inferior products at best, or worse, it renders these materials useless in the intended application thereby contributing to substantial economic losses to manufacturer and end-user alike.

The various degradation processes have been widely studied, and a number of stabilizers, e.g., acidity reducing agents, antioxidants, etc., have been suggested to minimize degradation; all of these stabilizers, however, have a limited stabilizing effect at best and are relatively expensive.

SUMMARY OF THE INVENTION

It is, thus, the primary object of this invention to provide saturated polyester compositions having unusually outstanding stability characteristics. Another object of the present invention is to provide stabilized polyester compositions useful as fibers, film, tire cord, polyurethane intermediates and adhesives. Still, another object is to provide stabilized polyester compositions having improved properties, e.g., color, viscosity stability and resistance to environmental attack. Various other objects and advantages of this invention will become apparent from the following description thereof.

It has now been found that polyesters having all of the above described properties can be obtained by adding to the polyester or copolyester a proportionately small amount of a synergistic combination comprising at least one 5 or 6 membered cyclic organic carbonate and at least one antioxidant selected from the group consisting of alkylated phenols, alkylidene bisphenols, alkylphosphites, arylphosphites, aromatic amines, and aromatic diamines having N- and N'- substituted aryl or alkyl groups.

In general, the carbonate components of the stabilizing combinations of this invention include those compounds having a 5 or 6 membered ring which contains the characteristic carbonate,

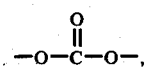

group. Among such compounds are included the alkylene carbonates having saturated rings, e.g., ethylene carbonate, propylene carbonate, the substituted and unsubstituted alkylene carbonates, etc.; and the vinylene carbonates having unsaturated —C=C— linkages within the ring, e.g., vinylene carbonate, propylvinylene carbonate, ethylvinylene carbonate, etc. The carbonates of the types having 5 membered rings as discussed above may be typically represented by the following general structures:

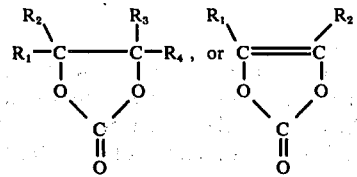

wherein the R's may be H; an aromatic group; an aliphatic group which may be saturated or unsaturated; or alicyclic group, said groups having from 2 to 18 carbon atoms. $R_1$, $R_2$, $R_3$, and $R_4$ may be the same or different.

The useful carbonates having 6 membered rings may be typically represented by the following general structure:

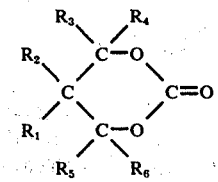

wherein the R's are as defined above.

In a varied aspect in the 5 and 6 membered ring structures the various R groups may be interconnected to give cyclic carbonates having open structures, condensed ring structures, polycyclic structures, etc. It will be appreciated by those skilled in the art that compounds containing more than one cyclic carbonate group will also be effective stabilizers when used in conjunction with the hereinbelow described antioxidants. Examples of such compounds include diglycerol carbonate, polyvinylene carbonate, etc. Also compounds containing both cyclic carbonate and antioxidant groups, e.g., pyrogallol carbonate (1-hydroxy-2,3-phenylene carbonate), tris(2,3-carbonyldioxyphenyl) phosphite (the reaction product of pyrogallol carbonate and phosphorus trichloride), etc. The preparation and identification of these cyclic carbonates and others are described in the literature, e.g., Methoden Der Organischen Chemie, Band VIII, pp. 107–110. In general, any compound containing 5 or 6 member cyclic carbonate or carbonates may be used, provided that other groups present in the same compound do not adversely effect the stabilities of the carbonate moiety nor the saturated polyester.

In general, the antioxidant components of the stabilizing combinations herein are those compounds which are capable of inhibiting oxidation.

Such compounds, which are either primary antioxidants, or secondary antioxidants which destroy peroxides and also regenerate primary antioxidants include alkyl substituted phenols, bisphenols, substituted bisphenols, thiobisphenols, polyphenols, thiobisalkylates, aromatic amines, and organic phosphites and polyphosphites, as described hereinbelow.

One group of alkyl substituted phenols may be structurally represented as follows:

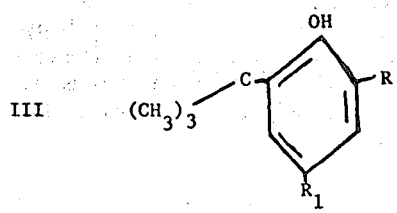

III wherein R is H, an alkyl group, or an alicyclic group, and $R_1$ may be alkyl or a symmetrical or unsymmetrical ester group linked to the phenolic ring by a terminal carbon; said groups containing from 1–18 carbon atoms. Examples of such compounds are 2, 6-di-tertiary-butyl-p-cresol and octadecyl beta (4-hydroxy-3, 5-di-tert-butylphenyl) propionate, etc.

Among the useful substituted bisphenols and thiobisphenols may be those structurally represented as follows:

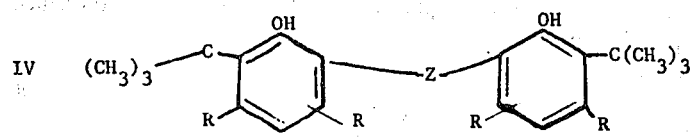

IV wherein Z is a methylene group, an alkylidene group containing from 2-18 carbon atoms, or sulphur. R is as defined in structure III, supra. Examples of such compounds are 2, 2' - thiobis- (6-t-butyl-3-methylphenol) and 4, 4' - thiobis (6-t-butyl-3-methylphenol), etc.

One type of the useful polyphenols may be structurally represented as follows:

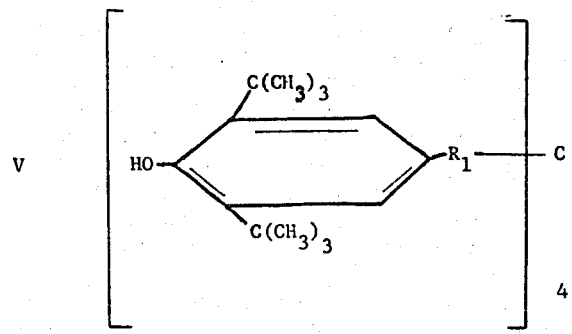

V wherein $R_1$ is defined in structure III, supra. Examples of such compounds are pentaerythrityl tetrakis[beta-(4-hydroxy-3,5-di-tert-butylphenyl)] propionate and the like.

In another aspect, the useful polyphenols may be of the type having the more complex structure represented as follows:

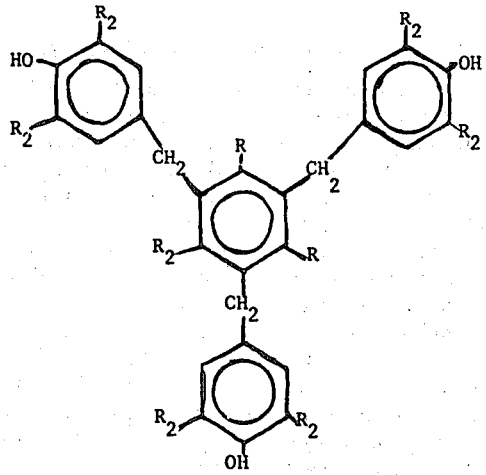

wherein R is as defined above in structure III and $R_2$ is a tertiary butyl group.

Among the useful dialkyl thiodiesters are included those which may be structurally represented as follows:

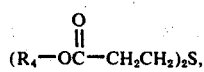

wherein $R_4$ is an alkyl group having from 4–20 carbon atoms.

Among the useful organic phosphites and phosphites are included diisooctyl phenyl phosphite, trioctyl phosphite, triisooctyl phosphite, tricyclohexyl phosphite, triphenyl phosphite, distearyl pentaerythrityl diphosphite, bis-neopentyl glycol triethylene glycol diphosphite, etc.

Among the useful aromatic amines are included N-phenyl-alpha-naphthylamine, N-phenyl-beta-naphthylamine, o- and p-ditolylamine; the p-phenylene diamines which may have alkyl, N- and N'- substitution groups; and the condensation products of aniline reacted with acetaldehyde or acetone, and diphenyl amine with acetone, etc.

As previously indicated, any saturated polyester, or copolyester may be stabilized with a suitable cyclic organic carbonate and antioxidant combination. Such stabilizable materials include the cross-linked three dimensional esters obtained by reacting polycarboxylic acids with polyols or those prepared from bifunctional reactants only, i.e., when omega-hydroxy carboxylic acids are heated or when a dibasic acid reacts with a dihydric alcohol to produce a linear polyester. Among such stabilizable polyesters may be included those prepared by the general melt polymerization techniques described in Whinfield et. al., U.S. Pat. No. 2,465,319 and inter alia, Snyder, U.S. Pat. No. 2,623,031. Other polyesters suitable for use in the practice of this invention are those prepared by reacting two moles of the half ester derived from a mono-basic acid and a glycol with 1 mole of a dibasic acid as disclosed in U.S. Pat. No. 2,575,196.

Additional information relating to the preparation of saturated polyesters, including the vulcanizable-elastomer type, are described by B. Bolding in "Polymers and Resins," D. Van Nostrand Co., Inc. 1959, 283–9.

The stabilizing combinations of this invention can be intimately admixed with the molten polyester in an inert atmosphere. That is to say, the carbonate and the antioxidant components may be incorporated, individually or in combination, with the molten polyester just prior to discharge from the reactor, as preferred in manufacturing operations, or with the remelted polyester. Said components may be added as their isolated compounds or, in order to achieve more rapid dispersion, they can be added in the form of a solution. The actual temperature and time required to achieve adequate dispersion will depend greatly on the composition of the particular polyester and its viscosity. Nevertheless, it is necessary, in all instances, that the temperature be maintained above the melting point of the polyester and stirring be continued long enough to ensure a smooth, homogeneous product.

As an alternate method it may be preferred to admix the crystalline carbonate component and the antioxidant component with the dry polyester resin and then store the mixture until further processing, i.e., extrusion, injection molding, etc., whereupon stabilization occurs.

With regard to proportions, the total carbonate and antioxidant stabilizing combination may be added in an amount ranging from 0.1 to 5.0 percent, by weight, of the polyester. Within said combination, the carbonate may comprise between 90–10 percent of the total weight. The actual amount of each component used is left up to the discretion of the practitioner. Normally, in order to provide substantially improved stability to the various polyesters, it is sufficient to employ a single carbonate with a single antioxidant at equal concentrations. But, for the purposes of this invention, it is preferred that the amount of the carbonate component, i.e., one or more carbonates, comprise between 50 and 80 percent, by weight, of the entire synergistic-stabilizing combination.

The effectiveness of the novel, synergistic, stabilizing combinations of this invention was determined by measuring the decrease in intrinsic viscosity (I.V.) of the polyester before and after heating in an open container in an oven for a fixed period. I.V. measurements (expressed in deciliters per gram (dl/gm) were made using a Cannon-Fenske capillary viscometer (size 100) as described by P. J. Flory in "Principles of Polymer Chemistry," VII, 1953, 309–310. The solvent used was 1, 1, 2, 2-tetrachloroethane, and the viscosity of the polyester at each phase of the test was measured at concentrations of 0.5, 1.0 and 1.5 grams per 100 ml. of said solvent. Any apparent decrease in molecular weight, due to thermal degradation, is indicated by a decrease in I.V.

The polyesters stabilized with the novel, synergistic stabilizing combinations of this invention exhibit lasting resistance to oxidative or hydrolytic or thermal degradation.

The novel, thermally resistant polyesters of this invention may effectively be utilized in a variety of commercial uses, i.e., synthetic fibers, films, tire cords, etc. These polyesters are most readily useful wherein thermal and oxidative degradation has heretofore been a problem. Such uses include ironable clothing articles, and, in particular, hot-melt adhesive compositions.

The polyesters may be further treated or otherwise processed without incurring any deleterious effects on their ability to resist thermal degradation. For example, their thermal stability is not impaired when optional ingredients such as fillers, plasticizers, colorents, etc., are called for. Similarly, no adverse effects are realized when the polyester is subjected to injection molding or biaxial orientation, e.g., stretching in two directions perpendicular to each other to form a film.

The advantage afforded by the stabilizers of the present invention are many: For example: 1. polyesters and copolyesters having superior heat stability can now be made and used in areas, e.g., hot melt adhesives, where degradation, due to prolonged heating in the melt, has limited their use. 2. physical and chemical properties of the stabilized polyesters are essentially maintained even after prolonged heating in air. 3. skin formation (surface cross-linking) is virtually eliminated. 4. there is very little change in melt viscosity. 6. cost advantages result due to the generally lower cost of the cyclic carbonates as compared with the cost of most antioxidants. These and other advantages will become apparent from the following examples, which further illustrate but do not limit the scope of the present invention.

In these examples, all quantities are given as parts, by weight, unless otherwise specified.

EXAMPLE I

This example illustrates the preparation of a thermally stable copolyester, using an alkylene carbonate and thiobisphenol antioxidant combination in accordance with this invention.

A bulk quantity of a copolyester was prepared by reacting two aryl dicarboxylic acids, an anhydride of an aryl dicarboxylic acid, and an alkanediol as set forth below. In this instance, a proportionately small amount of antioxidant was used.

Into a reaction vessel equipped with a mechanical stirrer, thermometer, nitrogen inlet, 18 inch Vigreux column, distillation head with thermometer, a Dean and Stark 20 ml. distillation receiver and a condenser, there were introduced the following ingredients:

| Ingredient | Amount |
| --- | --- |
| Dimethyl terephthalate | 970.0 g. |
| 1,4-Butanediol | 1440.0 g. |
| Zinc acetate (dihydrate) | 1.3 g. |
| Antimony trioxide | 1.3 g. |
| 4,4'-Thiobis(6-tert-butyl-m-cresol) | 0.65g. |
| Toluene | 5000 ml |

Under continuous agitation, the above ingredients were heated to and maintained at 219° C. for 3.5 hours to assure complete transesterification. Then residual methanol, toluene, and a small quantity of tetrohydrofuran were distilled off and discarded. Thereafter the contents of the reaction vessel were cooled to 140° C., and there were added thereto 664.0 grams of isophthalic acid, 148.0 grams of phthalic anhydride, and 50.0 ml. of xylene. Agitation was resumed, and the mixture was heated to and maintained at 240° C. to remove the water during refluxing of the xylene. The reaction was continued until an acid number of 8.4(mgs. of KOH/gm of sample) was indicated. Then the pressure was gradually reduced to between 1.0 and 2.0 mm. mercury. The temperature was gradually increased to and maintained at 250°–255° C. for 2.5 hours. 20 grams of chips obtained from the copolyester described above were placed in a 100 ml. beaker. The beaker was then mounted in an oil bath and equipped with a mechanical stirrer and a nitrogen supply source. Said beaker was then heated to about 200° C. to remelt the polyester. Then in a nitrogen atmosphere, there was added to said beaker, based on the weight of the polyester, 0.6 percent of ethylene carbonate and 0.3 percent of 4, 4' thiobis (6-tert-butyl-m-cresol). The molten mixture was stirred for about 4 minutes and then tested for thermal stability. Initial intrinsic viscosity (I.V.) was determined according to the method described hereinabove. The beaker was then stored in an oven set at 400° F. for 72 hours. Following the holding period, a final intrinsic viscosity measurement was made.

To prepare controls, three additional 20 gram portions of the polyester described above were placed in three separate beakers designated A, B, and C. These beakers were each mounted in an oil bath, equipped with a mechanical stirrer, and provided with a nitrogen supply source. Said beakers were then heated to about 200° C. to remelt the polyester. The molten polyester contained in beaker A remained unmodified to serve as a blank control. To beaker B there was added 0.9 percent, by weight of the polyester, of the ethylene carbonate only. And to beaker C there was added 0.9 percent, by weight of the polyester of the 4, 4' thiobis (6-tert-butyl-m-cresol) only. Then intrinsic viscosity measurements of the three controls were made before and after the 72 hour holding period at 400 20 F. as described above. Test results of the controls compared with those of the sample prepared above are as set forth in Table I below.

TABLE I

| Material Tested | Intrinsic Viscosity (deciliters/gram) | | % Change |
|---|---|---|---|
| | Intial | Final | |
| Test Sample | 0.398 | 0.338 | −15.1 |
| Control A | 0.398 | 0.240 | −38.7 |
| Control B | 0.398 | 0.272 | −31.7 |
| Control C | 0.398 | 0.302 | −24.1 |

As indicated above, the test sample of the polyester modified with the synergistic stabilizing combination incurred the least percentage reduction in intrinsic viscosity and was therefore most resistant to thermal degradation.

EXAMPLE II – V

These examples illustrate the usefulness of an alkylene carbonate in combination with varied antioxidants as stabilizing combinations in a saturated copolyester.

A series of 4 sample copolyesters and a suitable control for each sample were prepared as follows:

Into each of eight 100 ml beakers there were introduced 20 grams of the copolyester prepared in Example I. The beakers were then separated into pairs, one of each pair being designated the test sample and the other, the respective control. In each case the particular alkylene carbonate and antioxidant combination was added to the sample polyester, and a similar alkylene carbonate or the antioxidant was added to the control polyester in the manner employed in Part A of Example I. Compositions of the various samples were as follows:

| Modifying Agent | Sample No. and Amount (per cent, by weight of polyester) | | | |
|---|---|---|---|---|
| | II | III | IV | V |
| Ethylene Carbonate | 0.6 | 0.6 | 0.6 | 0.6 |
| Triphenyl phosphite | 0.3 | — | — | — |
| Pentaerythrityl tetrakis-[beta- (4-hydroxy-3,5-di-tert-butylphenyl)]propionate | — | 0.3 | — | — |
| 1,3,5-trimethylene, 2,4,6-tris (3,5-tert-butyl-4-hydroxybenzyl) benzene | — | — | 0.3 | — |
| N-phenyl-alpha naphthylamine | — | — | — | 0.3 |

The above described copolyesters, a standard control comprised of the unmodified copolyester, and a specific control for each sample, were tested for thermal stability according to the method described in Example I. Said specific control, in each case, contained 20 grams of the copolyester base modified with 0.9 percent, by weight, of the copolyester, of the same antioxidant employed in the corresponding sample. The latter copolyesters were designated control (II), control (III), control (IV), and control (V), respectively. Test results are set forth in Table 2 below.

TABLE 2

| Material Tested | Intrinsic Viscosity (deciliters/gram) | | % Change |
|---|---|---|---|
| | Initial | Final | |
| Control (Stnd.) | 0.398 | 0.240 | −38.7 |
| Sample II | 0.398 | 0.340 | −14.5 |
| Control (II) | 0.398 | 0.309 | −22.4 |
| Sample III | 0.398 | 0.309 | −22.4 |
| Control (III) | 0.398 | 0.298 | −25.1 |
| Sample IV | 0.398 | 0.312 | −21.6 |
| Control (IV) | 0.398 | 0.293 | −28.2 |
| Sample V | 0.398 | 0.350 | −12.0 |
| Control (V) | 0.398 | 0.313 | −21.3 |

As indicated by the data summarized above, the samples containing the stabilizing combinations showed the least degradation.

EXAMPLE VI–IX

These examples illustrate the effectiveness of additional carbonates, when used with an arylphosphite antioxidant, to stabilize copolyesters according to this invention.

A sufficient quantity of the copolyester base prepared in Example I was used to prepare four test samples and six controls. Each test sample comprised 20 grams of the copolyester having incorporated therein the particular synergistic stabilizing combination. Each control, except that having 20 grams of the unmodified copolyester only, comprised 20 grams of the copolyester having incorporated therein either a single carbonate or the antioxidant component only.

To make the test samples and the controls having the single components therein, the procedural steps of Example I were repeated, except herein the 4, 4'thiobis (6-tert-butyl-m-cresol) and ethylene carbonate were replaced with triphenyl phosphite and varied carbonate combinations as follows:

| Modifying Agent | Sample No. and Amount of Agent (per cent, by weight, of the copolyester) | | | |
|---|---|---|---|---|
| | VI | VII | VIII | IX |
| Triphenyl phosphite | 0.6 | 0.6 | 0.6 | 0.6 |
| Trimethylene carbonate | 0.6 | — | — | — |
| Neopentylene carbonate (2,2-dimethyl trimethylene carbonate) | — | 0.6 | — | — |
| Catechol carbonate (o-phenylene carbonate) | — | — | 0.6 | — |
| Styrene carbonate | — | — | — | 0.6 |

The above described copolyesters, a standard control comprised of the unmodified copolyester, and a specific control for each sample, were tested for thermal stability according to the method described in Example I. Herein said specific control, in each case, contained 20 grams of the copolyester base modified with 1.2 percent, by weight, of the copolyester of the particular carbonate employed in the corresponding sample. The latter copolyesters were designated Control (VI), Control (VII), Control (VIII) and Control (IX) respectively. The thermal stability of the test samples and the controls were determined and evaluated in the manner set forth in Example I. Results are presented in Table 3 below.

TABLE 3

| Material Tested | Intrinsic Viscosity (deciliter/gram) | | % Change |
|---|---|---|---|
| | Initial | Final | |
| Control (Stnd) | 0.398 | 0.268 | −32.7 |
| Control (phosphite only) | 0.398 | 0.324 | −18.6 |
| Sample VI | 0.398 | 0.369 | −7.3 |
| Control (VI) | 0.398 | 0.287 | −27.9 |
| Sample VII | 0.398 | 0.364 | −8.5 |
| Control (VII) | 0.398 | 0.277 | −30.4 |
| Sample VIII | 0.398 | 0.375 | −15.1 |
| Control (VIII) | 0.398 | 0.329 | −17.3 |
| Sample IX | 0.398 | 0.338 | −15.1 |
| Control (IX) | 0.398 | 0.292 | −26.7 |

The data summarized above illustrates that the samples containing the stabilizing combinations incurred less degradation than the respective controls.

EXAMPLE X

This example illustrates the usefulness of a synergistic combination comprising an alkylene carbonate and two antioxidants as a copolyester stabilizer.

Using additional 20 gram portions of the copolyester prepared in Example I and the procedure described in Part A of that same example, a test sample having 0.6 percent, by weight, of ethylene carbonate in combination with 0.15 percent, by weigh, of pentaerythrityl tetrakis-[beta-(4-hydroxy-3,5-tert butyl phenyl)] propionate and 0.15 percent, by weight, of dilauryl thiodipropionate was prepared. A control having the same combination of antioxidants but no carbonate was also prepared. The resulting products were then tested for thermal stability in the manner set forth in Example I. The test results compared as follows in Table 4.

TABLE 4

| Material Tested | Intrinsic Viscosity (deciliters/gram) | | % Change |
|---|---|---|---|
| | Initial | Final | |
| Test Sample | 0.398 | 0.325 | −18.3 |
| Control | 0.398 | 0.290 | −27.2 |

Based on the above data, it is thus seen that the resistance to thermal degradation of a copolyester may also be improved, when two antioxidants are employed with the carbonate to make-up the synergistic stabilizing combination.

EXAMPLE XI

This example illustrates synergistic stabilizing combinations having greater amounts of the carbonate component.

Using additional 20 gram portions of the polyester prepared in Example I and the test procedure set forth in that same example, a sample having 1.0 percent, by weight, of ethylene carbonate and 0.3 percent, by weight, of 4, 4'-thiobis (6-tert-butyl-m-cresol); and a control having the same amount of the latter ingredient only, were prepared. The thermal stability of the test sample and the control were then determined according to the method employed in Example I. Test results are tabulated in Table 5, show that the test samples had improved thermal stability.

TABLE 5

| Material Tested | Intrinsic Viscosity (deciliters/gram) | | % Change |
|---|---|---|---|
| | Initial | Final | |
| Test Sample | 0.421 | 0.380 | −9.7 |
| Control | 0.421 | 0.327 | −22.3 |

Summarizing, it is thus seen that this invention provides a novel polyester composition characterized by its unusually greater resistance to thermal and environmental degradation, due to the presence of a carbonate and antioxidant stabilizing combination. The resulting combination exhibits outstanding synergistic stability performance, i.e., the performance of the combination substantially exceeds thee sum total of the performances exhibited by the individual components thereof, when used separately. It will be understood that variations in the proportions of the carbonate and the antioxidant components, as well as the particular stabilizable polyester to which the combination is adaptable, may be made without departing from the spirit of the invention defined in the following claims.

What is claimed is:

1. A saturated polyester composition stabilized against thermal degradation comprising:
  a. a polyester blended with
  b. 0.3 to 5.0 percent, by weight of the polyester, of a combination comprising
    1. 10 to 90 percent, by weight, of at least one cyclic organic carbonate having at least one cyclic organic carbonate group per molecule containing 5 – 6 atoms in the ring, and
    2. the remainder of said combination comprising at least one antioxidant selected from the group consisting of alkylated phenols and alkylidene bisphenols wherein the alkyl groups contain from 2 to 18 carbon atoms, thiobisphenols and polyphenols.

2. The stabilized polyester composition of claim 1 wherein said carbonate is ethylene carbonate and said antioxidant is 1,3,5-trimethyl 2,4,6-tris(3,5-tert-4-hydroxybenzyl)benzene.

3. The stabilized polyester composition of claim 1 wherein said carbonate is ethylene carbonate; and said antioxidant is 4, 4'-thiobis (6-tert-butyl-m-cresol).

4. The stabilized polyester composition of claim 1 wherein said carbonate is ethylene carbonate; and said antioxidant component is a mixture of pentaerythrityl tetrakis[-beta-(4-hydroxy-3,5-tert-butylphenyl)] propionate and dilauryl thiodipropionate.

* * * * *